United States Patent
Canzian

(10) Patent No.: US 12,055,288 B2
(45) Date of Patent: Aug. 6, 2024

(54) ARTICULATING DOME GIMBAL ASSEMBLY

(71) Applicant: II-VI Delaware, Inc., Wilmington, DE (US)

(72) Inventor: Blaise J. Canzian, Murrysville, PA (US)

(73) Assignee: II-VI DELAWARE, INC., Wilmington, DE (US)

(*) Notice: Subject to any disclaimer, the term of this patent is extended or adjusted under 35 U.S.C. 154(b) by 0 days.

(21) Appl. No.: 17/658,749

(22) Filed: Apr. 11, 2022

(65) Prior Publication Data

US 2023/0324033 A1    Oct. 12, 2023

(51) Int. Cl.
*F21V 21/30* (2006.01)
*F16M 11/12* (2006.01)
*F16M 13/02* (2006.01)

(52) U.S. Cl.
CPC ........... *F21V 21/30* (2013.01); *F16M 11/123* (2013.01); *F16M 13/02* (2013.01)

(58) Field of Classification Search
CPC ....... F21V 21/30; F16M 11/123; F16M 11/18; F16M 11/10; F16M 11/2014; F16M 11/2064; H04N 23/51; H04N 23/698; G08B 13/1963; G08B 13/19619; G03B 17/561
See application file for complete search history.

(56) References Cited

U.S. PATENT DOCUMENTS

| | | | | |
|---|---|---|---|---|
| 3,732,368 A | * | 5/1973 | Mahlab | G08B 13/1963 348/151 |
| 5,153,623 A | * | 10/1992 | Bouvier | G08B 13/1963 348/151 |
| 5,765,043 A | * | 6/1998 | Tyler | G08B 13/1963 396/12 |
| 5,897,223 A | * | 4/1999 | Tritchew | G02B 27/644 348/144 |
| 6,268,882 B1 | * | 7/2001 | Elberbaum | H04N 7/183 348/E7.087 |
| 8,764,318 B2 | * | 7/2014 | Wada | H04N 23/51 348/151 |
| 2006/0017842 A1 | * | 1/2006 | Jun | H04N 23/50 348/E5.025 |
| 2008/0002176 A1 | * | 1/2008 | Krasutsky | G01S 7/4813 356/5.01 |

* cited by examiner

*Primary Examiner* — Bradley Duckworth
(74) *Attorney, Agent, or Firm* — Blank Rome LLP

(57) ABSTRACT

A dome protects an articulating gimbal that orients a line-of-sight of a laser beam. The dome is mounted on a host and encloses the articulating gimbal. The dome has first and second shells. The first shell is rotatable about a first axis relative to the host, and the second shell is disposed on the first shell and is rotatable about a second axis relative to the first shell. A first actuator is coupled to the first shell and is configured to rotate the first shell about the first axis relative to the host. A second actuator is coupled to the second shell and is configured to rotate the second shell about the second axis relative to the first shell. A controller is coupled to the first and second actuators and is configured to match the rotation of the first and second shells to the line-of-sight of the laser beam.

15 Claims, 9 Drawing Sheets

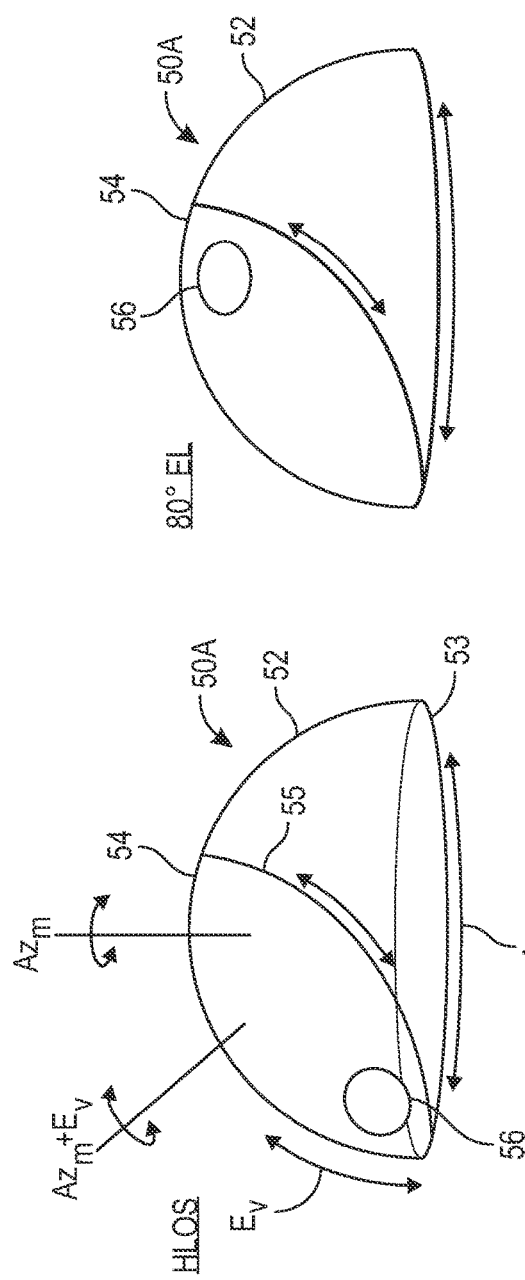
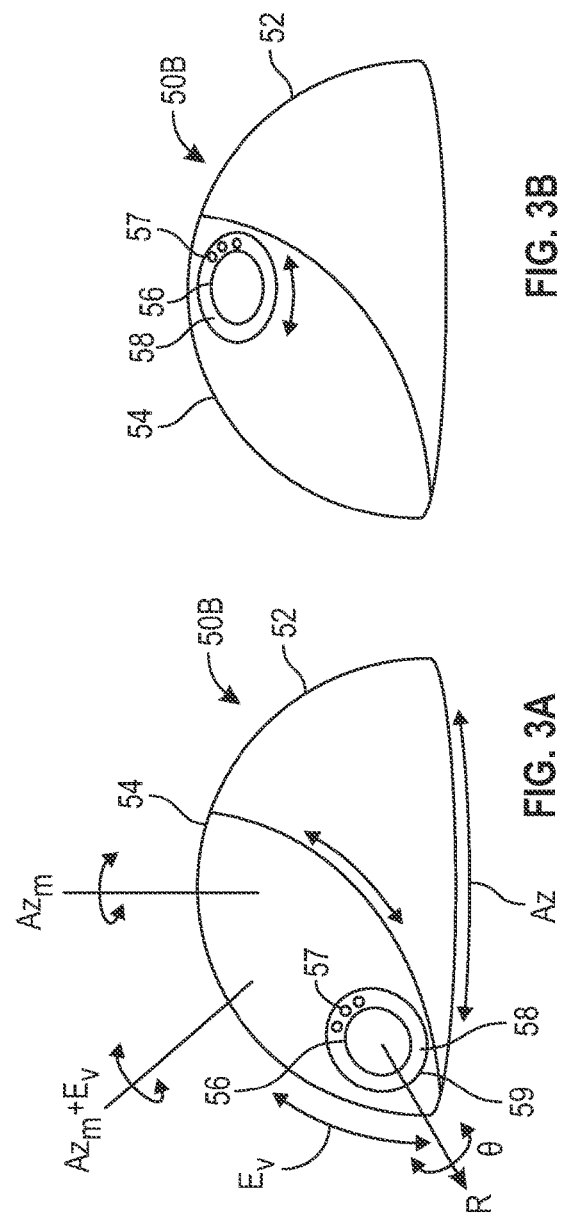

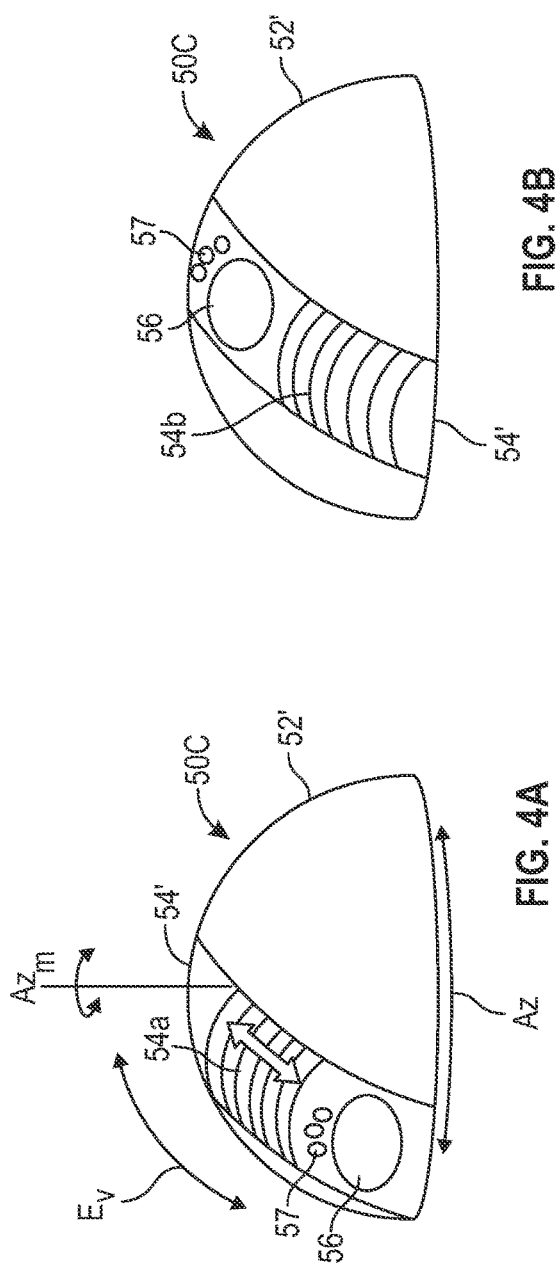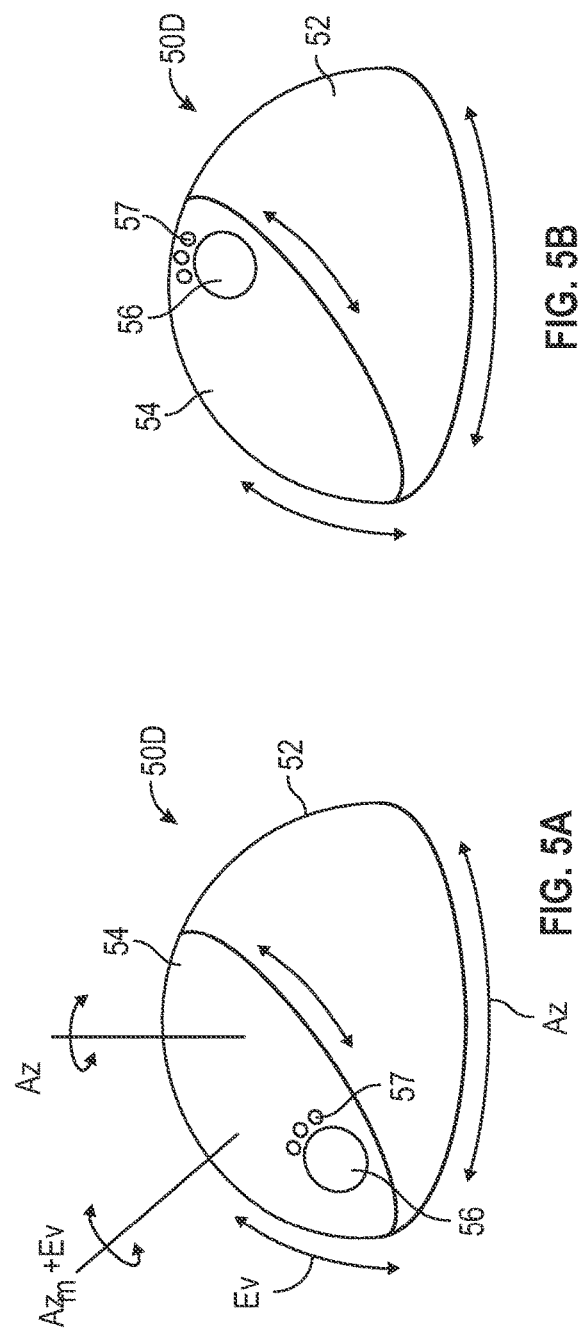

ARTICULATING DOME GIMBAL ASSEMBLY

BACKGROUND OF THE DISCLOSURE

A beam director can be used on a vehicle, aircraft, structure, or other component and can direct a laser beam toward a desired target. To allow the beam director to have a more extensive line-of-sight, the beam director is directly mounted on the component and is exposed to the environment. For example, FIG. 10 illustrates a common configuration of a beam director 20 used on a component 10.

The beam director 20 includes a base 22 mounted to the host component 10. The beam director 20 shown here has a two-axis gimbal structure having a yoke 24 and a payload body 26. The yoke 24 of the gimbal structure can rotate relative to the base 22 about an azimuthal or pan axis Az. The payload body 26 is supported in the yoke 24 to be rotated therewith. For its part, the payload body 26 can rotate relative to the yoke 24 about an elevation or tilt axis Ev.

As will be appreciated, a motor, bearings, seals, and the like (not shown) are used for the rotation between the yoke 24 and the base 22. Likewise, another motor, bearings, seals, and the like (not shown) are used for the rotation between the payload body 26 and the yoke 24. The payload body 26 houses all of the optical components of the beam director 20 therein and supports a protective window optic 28 from which the laser beam can be emitted. All of the internal optical components, motors, bearings, and the like need to be properly housed in protective housings to avoid environmental exposure. This increases the weight required for the beam director 20, which increases the torque required for rotation and increases the size of the motors.

Additionally, wind forces bear directly on the gimbal structure of the beam director 20, requiring more robust protective housing. The motors for the gimbal structure must therefore be up-sized to address unbalanced wind forces, leading to increased weight and increased power consumption.

Furthermore, the seals incorporated into the gimbal axes must be robust because the path of the high-energy laser beam inside the payload body 26 must be free of contaminants, including humidity and dust. These seals to keep any liquids, moisture, sand, and dust out of the beam director 20 can be large sources of friction that oppose the gimbal motion. This friction is an issue for precise motion control, leading to high residual jitter and high following error, both of which reduce the efficiency of the beam director 20.

Finally, the payload body 26 carries the exit window 28 at an extreme position. This window 28 is the largest, heaviest optic of the optical system and is the furthest optic in the optic train. The cantilevered mass of the exit window 28 causes sag due to the force of gravity. This can lead to optical misalignment, which reduces the exit beam quality and thus reduces the efficiency of the beam director. Optical misalignment can be reduced by increasing the stiffness of the beam expander structure, but this would lead to an increased weight of the beam director 20, which also increases motor size.

As will be appreciated, moving and controlling a beam director with precision can be hindered when increased size, weight, and power are required. The subject matter of the present disclosure is directed to overcoming, or at least reducing the effects of, one or more of the problems set forth above.

SUMMARY OF THE DISCLOSURE

In one embodiment, a structure is disclosed for protecting an articulating gimbal mounted on a host. The articulating gimbal is configured to orient a first line-of-sight of a laser beam. The structure comprises a dome, a first actuator, a second actuator, and a controller. The dome is mounted on the host and encloses the articulating gimbal. The dome has first and second shells. The first shell is rotatable about a first axis relative to the host. The second shell is disposed on the first shell and is rotatable about a second axis relative to the first shell, the second shell having a first window. The first actuator is coupled to the first shell and is configured to rotate the first shell about the first axis relative to the host. The second actuator is coupled to the second shell and is configured to rotate the second shell about the second axis relative to the first shell. The controller is coupled to the first and second actuators and is configured to actuate the first and second actuators to position the first window in the first line-of-sight of the laser beam.

In another embodiment, a structure is disclosed herein for protecting an articulating gimbal mounted on a host. Again, the articulating gimbal is configured to orient a first line-of-sight of a laser beam. The structure comprises a first dome shell, a first seal, a first actuator, a second dome shell, a second seal, a second actuator, and a controller. The first dome shell is mounted on the host and encloses a first portion of the articulating gimbal. The first shell has a first edge disposed thereabout and defines a first opening therein. The first seal is disposed between the first edge of the first shell and the host. The first actuator is coupled to the first dome shell and is configured to rotate the first shell on the first edge about a first axis relative to the host.

The second dome shell is mounted in the first opening of the first dome shell and encloses a remaining portion of the articulating gimbal. The second dome shell has a second edge disposed thereabout and has a first window therein. The second seal is disposed between the second edge of the second dome shell and the first opening of the first dome shell. The second actuator is coupled to the second dome shell and is configured to rotate the second dome shell on the second edge about a second axis relative to the first dome shell. The controller is coupled to the first and second actuators and is configured to actuate the first and second actuators to position the first window in the first line-of-sight of the laser beam.

In another embodiment, a structure is disclosed herein for protecting an articulating gimbal mounted on a base. The articulating gimbal is configured to position a beam director optical element. The structure comprises a dome shell, a first seal, a first actuator, a spherical segment shell, a second seal, a second actuator, and a controller. The dome shell is mounted on the base and encloses the articulating gimbal. The dome shell defines a spherical segment opening and has a first edge. The first seal is disposed between the first edge of the dome shell and the base. The first actuator is coupled to the dome shell and is configured to articulate the dome shell about a first axis relative to the base.

The spherical segment shell is mounted in the spherical segment opening of the dome shell and encloses the articulating gimbal. The spherical segment shell has a window and having a second edge. The second seal is disposed between the second edge of the spherical segment shell and the spherical segment opening of the dome shell. The second actuator is coupled to the spherical segment shell and is configured to articulate the spherical segment shell about a second axis relative to the dome shell. The controller is coupled to the first and second actuators and is configured to actuate the first and second actuators to position the first window in the first line-of-sight of the laser beam.

An apparatus disclosed herein can be used on a host. The apparatus comprises an articulating gimbal and comprises a structure according to the embodiment disclosed above for protecting the articulating gimbal.

The foregoing summary is not intended to summarize each potential embodiment or every aspect of the present disclosure.

BRIEF DESCRIPTION OF THE DRAWINGS

FIGS. 2A-2B illustrate one embodiment of an articulating dome shell according to the present disclosure in two orientations.

FIGS. 3A-3B illustrate another embodiment of an articulating dome shell according to the present disclosure in two orientations.

FIGS. 4A-4B illustrate yet another embodiment of an articulating dome shell according to the present disclosure in two orientations.

FIGS. 5A-5B illustrate an additional embodiment of an articulating dome shell according to the present disclosure in two orientations.

DETAILED DESCRIPTION OF THE DISCLOSURE

Figure 1A:
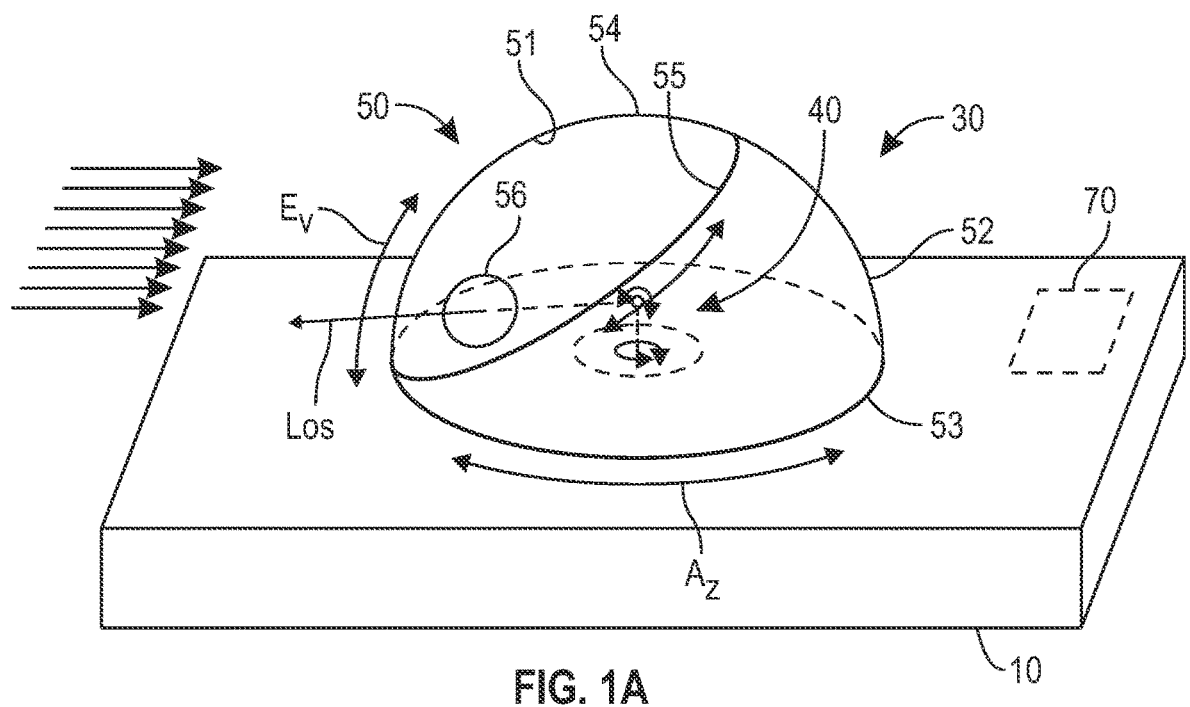
FIGS. 1A-1B illustrate an articulating dome shell according to the present disclosure for a beam director in two orientations.
Figure 1B:
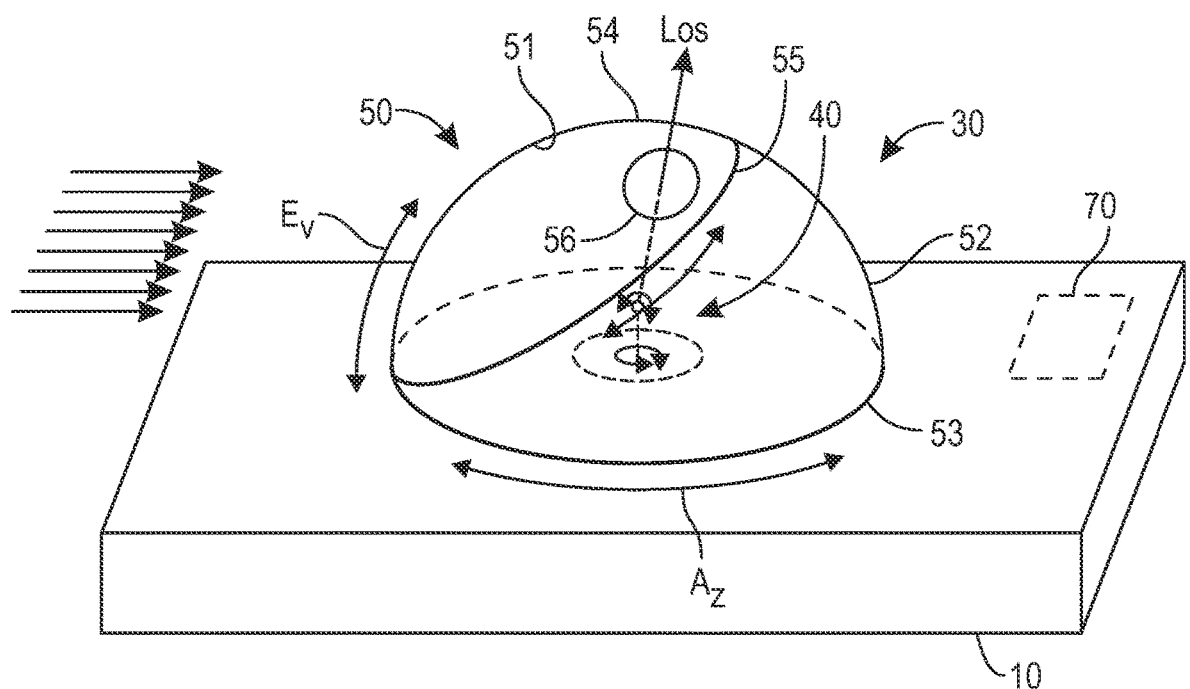

FIGS. 1A-1B illustrate a beam director assembly 30 of the present disclosure having an articulating dome shell 50 enclosing an articulating gimbal 40. The assembly 30 is shown in two orientations. (The articulating gimbal 40 is only shown schematically). The dome shell 50 mounts to a host component 10, which can be a vehicle, an aircraft, a stationary structure, or the like, and the dome shell 50 encloses the articulating gimbal 40 mounted inside the dome shell 50. The dome shell 50 includes a primary dome 52, a secondary dome 54, and a protective optic 56. The radius of the shell 50 may only need to be slightly larger than the swept radius for the articulating gimbal 40 housed inside.

Briefly, the dome shell 50 acts as a structure for protecting articulating gimbal 40 mounted on the host component 10. The articulating gimbal 40 is configured to orient a line-of-sight (LOS) of a laser beam. The primary dome 52 is rotatable about a first axis relative to the host component 10. The secondary dome 54 is disposed on the primary dome 52 and is rotatable about a second, carried axis relative to the primary dome 52. The secondary dome 54 has a window with the protective optics 56. A first actuator (not shown) coupled to the primary dome 52 is configured to rotate the primary dome 52 about the first axis relative to the host component 10. Meanwhile, a second actuator (not shown) coupled to the secondary dome 54 is configured to rotate the secondary dome 54 about the second axis relative to the primary dome 52. A controller or control system 70 coupled to the first and second actuators is configured to actuate the first and second actuators to position the protective optic 56 in the line-of-sight of the laser beam.

More particularly, the primary dome 52 has an environmental seal 53 along its edge with the host component 10. The secondary dome 54 of the dome shell 50 is carried by the primary dome 52 and has an environmental seal 55 along its edge with the primary dome 52. The protective optic or window 56 is disposed on the secondary dome 54.

During operation, the primary dome 52 can be articulated about an azimuthal or pan axis Az to match the rotation of the articulating gimbal 40 about the azimuth Az. This movement moves the secondary dome 54 and the protective optic 56. During operation, the secondary dome 54 can be separately or concurrently articulated about an elevation or tilt axis Ev to match the rotation of the articulating gimbal 40 about the elevation Ev. This movement also moves the protective optic 56. Because the rotation of the secondary dome 54 on the primary dome 52 also produces changes in the azimuthal axis, coordination between the rotation about the two axes Az and Ev may be necessary as noted below.

The shell 50 (and its associated motion system) encounters friction from the environment seals 53, 55, but the articulating gimbal 40 housed inside does not need to move against that friction. Additionally, the shell 50 (and its associated motion system) carries the protective optic 56, which is typically the largest, heaviest optic of the optical system. However, the articulating gimbal 40 housed inside the shell 50 does not need to carry and move the optic 56 so movement and control of the articulating gimbal 40 are greatly simplified.

Preferably, the dome shell 50 is moved independently of the articulating gimbal 40 enclosed in the shell 50. In this way, the two components 40 and 50 of the assembly 30 can be moved independently from one another without a physical connection between them. Thus, actuators (not shown) to move the articulating gimbal 40 do not need to be sized and powered to also move the dome shell 50 and visa-versa. Instead, coordinated movement is achieved through simultaneous control of separate actuators (not shown). The coordinated control can be continuous, meaning that the protective optic 56 is moved in unison with the direction of the articulating gimbal 40 so that the line-of-sight of the articulating gimbal 40 is maintained aligned with the optic axis of the protective optic 56. In this way, the motion of the domes 52, 54 are synchronized with the gimbal motion of the articulating gimbal 40 to keep the protective optic 56 aligned with the line-of-sight of the articulating gimbal 40.

Other forms of operation are possible. For example, instead of continuous alignment, the two components 40 and 50 can be moved through separate paths to aligned endpoints where the protective optic 56 and the articulating gimbal 40 are aligned. Here, the optic 56 and articulating gimbal 40 may not be aligned during movement between the endpoints.

The articulating dome shell 50 is preferably composed of a lightweight, protective material. For example, the primary dome 52 and the secondary dome 54 can be composed of a lightweight metal, plastic, or composite material that provides environmental protection to the articulating gimbal (40) enclosed in the shell 50.

As can be seen, the motion of the shell's domes 52, 54 encounters friction from the environmental seals 53, 55. This simplifies the structural requirements, motion, and control for the articulating gimbal 40. In this way, residual jitter and following error of the articulating gimbal's line-of-sight can be reduced. By off-loading the sealing function to the environmental seals 53, 55, the friction on the gimbal of the articulating gimbal 40 is greatly reduced, allowing significant improvement (decrease) in line-of-sight residual jitter and following error. The reduction in line-of-sight residual jitter and following error also enables more precise maintenance of high-energy laser power on a target, improving the efficiency of the beam director assembly 30.

Overall weight of the beam director assembly 30 is reduced. The articulating dome shell 50 is lightweight with no structural function other than acting as a protective enclosure. By shielding the articulating gimbal 40 and its gimbal from the environment using the articulating dome 50, the articulating gimbal 40 and its gimbal can take an open, skeletal form. The weight reduction also reduces the mass moment of inertia, reducing weight for actuators on the articulating gimbal 40. The weight reduction makes the assembly 40 more transportable and adaptable to a greater variety of platforms.

Moreover, any gravity sag that would be caused by carrying the protective optic 56 on the articulating gimbal 40 is eliminated. By supporting the weight of the optic 56 on the articulating dome 50, optical misalignment due to sag of the articulating gimbal 40 is greatly reduced, improving beam quality and therefore system efficiency.

Just as important, wind loading on the gimbal structure of the articulating gimbal 40 is eliminated. Eliminating wind loading as a torque disturbance leads to reduced residual jitter and following error (thus improving efficiency) and also leads to reduced weight because gimbal actuators do not need to be sized to overcome unbalanced wind forces.

Eye safety can also be improved while thermal deformation is decreased. High-energy laser systems emit stray light as a necessary consequence of their optical systems. The stray light poses an eye-safety hazard. The interior surface 51 of the dome 50 can have a high-reflectivity coating, such as gold coating, to manage stray light.

The high-reflectivity coating on the interior surface 51 of the articulating dome 50 can cause any stray light to execute multiple internal reflections inside the dome 50 before escaping via the protective optic 56. The internal reflections of the stray light create an integrating sphere effect that leads to an extremely wide divergence of exiting stray light, greatly reducing the nominal ocular hazard distance. The even stray light distribution creates no hot spots on the articulating gimbal 40 and articulating gimbal structure, preserving optical alignment.

FIGS. 2A-2B illustrate one embodiment of an articulating dome shell 50A according to the present disclosure in two orientations. This dome shell 50A is similar to that discussed above with respect to FIGS. 1A-1B. As before, the dome shell 50A includes a primary dome 52, a secondary dome 54, and a protective optic 56. Although not shown here, an articulating gimbal (40) with its gimbal structure and beam expander is housed inside the dome shell 50A.

Axes are shown in FIGS. 2A-2B to show the movement of the domes 52, 54 of the shell 50A. The primary dome 52 can be rotated about an azimuthal or pan axis Az. When the primary dome 52 is rotated, the secondary dome 54 having the protective optic 56 is also rotated about the azimuthal Az. The line-of-sight for the beam from the optic 56 can thereby have its direction changed along the azimuth.

The secondary dome 54 can be rotated about a carried axis Az+Ev. When the secondary dome 54 is rotated, the azimuthal Az and elevation Ev of the protective optic 56 change together. Therefore, to have the elevation of the line-of-sight for the beam from the optic 56 change, corrective adjustments to the azimuth of the primary dome 52 will be necessary. These motions can be coordinated through straightforward geometric equations.

FIGS. 3A-3B illustrate another embodiment of an articulating dome shell 50B according to the present disclosure in two orientations. This dome shell 50B is similar to that discussed above with respect to FIGS. 2A-2B in that the shell 50B includes a primary dome 52, a secondary dome 54, and a protective optic 56. Here, an additional element of the dome shell 50B includes a window bezel 58 that encloses the protective optic 56. This bezel 58 includes an environmental seal along its edge 59 with the secondary dome 54. Secondary optics 57 are disposed in the bezel 58 with respect to the centrally located protective optic 56 inside the bezel 58. This bezel 58 can be rotated relative to the secondary dome 54 about a roll axis R so that the orientation of the optics 56, 57 can also be changed.

For example, high-energy laser systems may require the use of auxiliary sensors co-aligned with the main high-energy laser beam. The auxiliary sensors are typically carried in a piggyback fashion on the structure of the articulating gimbal (40). The additional optics 57 adjacent the main optic 56 shown here provide windows for these types of auxiliary sensors. Although such sensors could use the same optic 56 as for the laser beam, the sensors in many instances require different filtering or protection than the beam for the main optic 56. Therefore, separate optics 57 of different materials, filtering, and other qualities are typically needed. The rotating bezel 58 is mechanized by a third actuator (not shown) so alignment can be adequately controlled to compensate for the rotation introduced by the dome's movements.

FIGS. 4A-4B illustrate yet another embodiment of an articulating dome shell 50C according to the present disclosure in two orientations. The dome shell 50C includes a primary dome 52' that has a wide dome slit or spherical segment opening. This wide dome slit is covered by a spherical segment shell, a bellows, or an overlapping leaf set 54', which is mounted in the wide dome slit. The leaf set 54' seals with the primary dome 52' and carries a protective optic 56.

During operation, the primary dome 52' can be articulated about an azimuthal axis Az to match the rotation of the articulating gimbal (40) enclosed therein about the azimuth Az. This movement moves the leaf set 54' and the protective optic 56. During operation, the leaf set 54' can be articulated about an elevation or altitude axis Ev to match the rotation of the articulating gimbal (40) about the elevation Ev. This movement moves the protective optic 56. Here, rotation of the leaf set 54' in the dome's slit on the primary dome 52' does not produce changes in the azimuthal axis because the dome's slit having the leaf set 54' lies preferably on a central division of the primary dome 52'.

As shown, the leaf set 54' can include a plurality of interleaved slats 54a-b on both sides of the protective optic 56. These interleaved slats 54a-b expand and contract with the movement of the leaf set 54' as the elevation of the protective optic 56 is changed. In this sense, the interleaved slats 54a-b act as an accordion or bellows structure enclosing the interior of the shell 50C while the protective optic 56 is moved consistent with an elevation-over-azimuth articulating gimbal (40) inside the dome shell 50C.

FIGS. 5A-5B illustrate yet another embodiment of an articulating dome shell 50D according to the present disclosure in two orientations. This dome shell 50D is similar to that shown in FIGS. 3A-3B in that it includes a primary dome 52, a secondary dome 54, and a protective optic 56. Here, instead of including a window bezel (i.e., 58 of FIGS. 3A-3B) that encloses the protective optic 56 and has secondary optics 57, the second dome 54 includes the secondary optics 57 in a fixed position adjacent the protective optic 56. Therefore, the orientation of the secondary optics 57 relative to the protective optic 56 is not changed. Instead, the gimbal structure of the internal articulating gimbal (40) can include a roll axis that would allow any ancillary sensors on the articulating gimbal (40) to be aligned with these secondary optics 57 during movement.

Figure 9C:
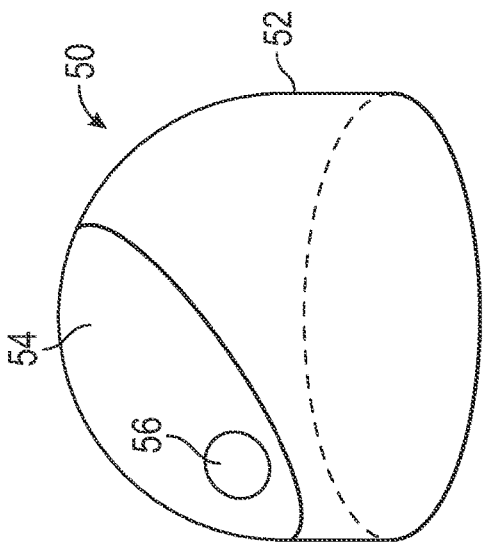
FIGS. 9A-9C illustrate a range of possible articulating dome envelope shapes.
Figure 9B:
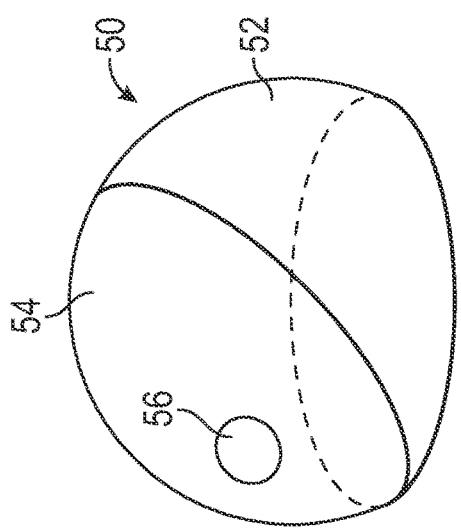
Figure 9A:
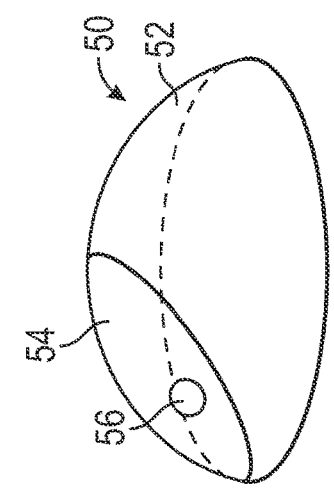
Figure 10:
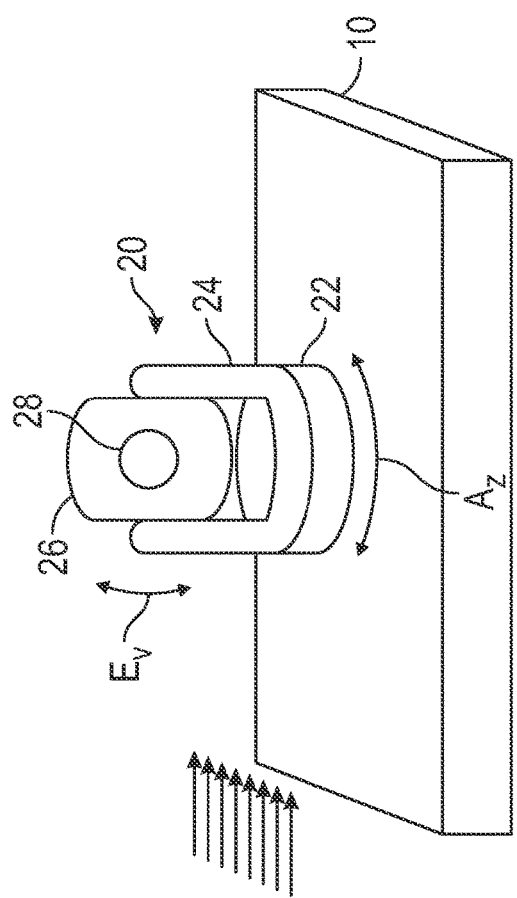
FIG. 10 illustrates a common configuration of a beam director.

The dome shells 50 of FIGS. 1A through 5B have been generally depicted as being hemispheres. Accordingly, the line-of-sight can be as much as 360-degrees along the azimuth Az and 180-degrees along the elevation Ev. The dome shells 50 can be less than a hemisphere if less elevation is needed, such as shown in FIG. 9A. Likewise, if line-of-sight needs to point below the horizon at greater elevation angles, then the dome shell 50 can extend to a fuller portion of a sphere greater than a hemisphere, such as shown in FIG. 9B. Additionally, other shapes can be used, such as a dome shell having a cylindrical base portion as shown in FIG. 9C.

Figure 6C:
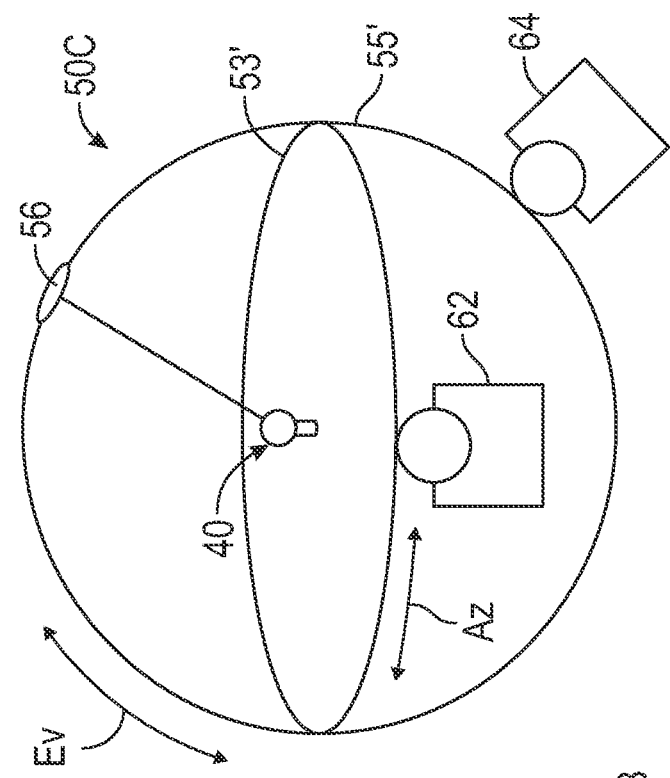
FIG. 6C illustrates a schematic of actuators for the articulating dome shell according to FIGS. 4A-4B.
Figure 6B:
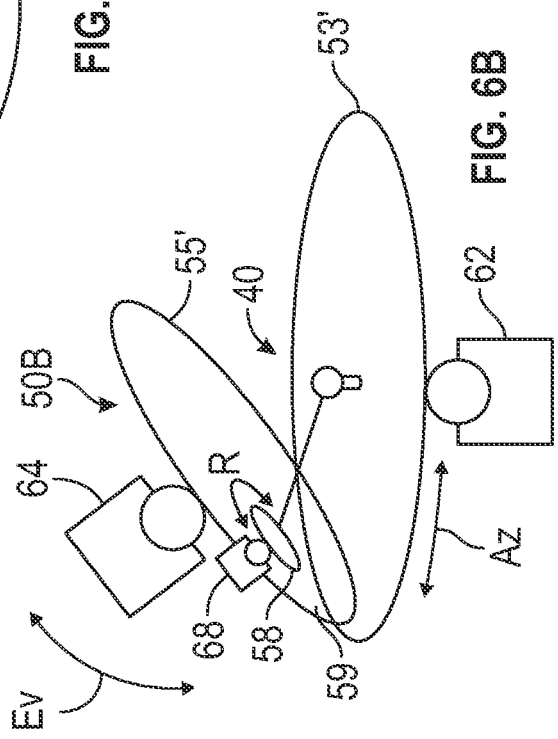
FIG. 6B illustrates a schematic of actuators for the articulating dome shell according to FIGS. 3A-3B.
Figure 6A:
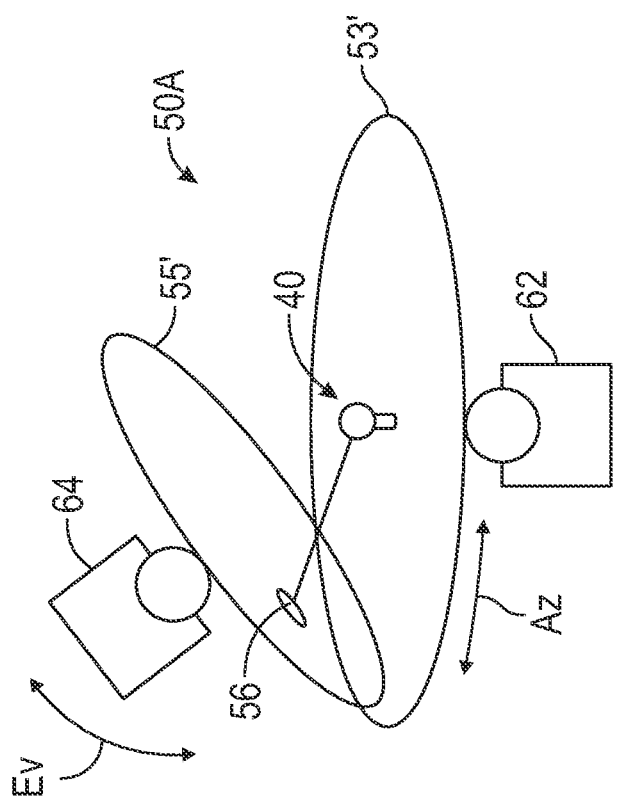
FIG. 6A illustrates a schematic of actuators for the articulating dome shell according to FIGS. 2A-2B.

FIG. 6A illustrates a schematic of actuators for the articulating dome shell 50A according to FIGS. 2A-2B. A main actuator 62 engages an edge or rim 53' for the primary dome (52) so that actuation of the main actuator 62 rotates the primary dome (52) along the azimuth axis Az, which changes the azimuth of the protective optic 56. A secondary actuator 64 carried by the primary dome (52) engages an edge or rim 55' for the secondary dome (54) so that the actuation of the secondary actuator 64 rotates the secondary dome (54) along a carried axis, which changes the elevation Ev and azimuth Az of the protective optic 56.

Various types of actuators 62, 64 and mechanical arrangements of gears, bearings, belts, and the like can be used. For example, a first electric motor 62 can rotate a pinion gear engaged with a rack gear about the rim 53' of the primary dome 52, and a second electric motor 64 carried by the primary dome 52 can rotate a pinion gear engaged with a rack gear about the rim 55' of the secondary dome 52. Because power for the second electric motor 64 must be carried through the main rim 53', slip rings along the rim 53' can provide power across the articulating elements of the domes 52, 54. The motors for the actuators 62, 64 may need to be high-torque, but the precision does not need to be as high as required for the articulating gimbal 40.

FIG. 6B illustrates a schematic of actuators for the articulating dome shell 50B according to FIGS. 3A-3B. A main actuator 62 engages an edge or rim 53' for the primary dome (52) so that actuation of the main actuator 62 rotates the primary dome (52) along the azimuth axis Az, which changes the azimuth of the protective optic 56. A secondary actuator 64 carried by the primary dome (52) engages an edge or rim 55' for the secondary dome (54) so that the actuation of the secondary actuator 64 rotates the secondary dome (54) along a carried axis, which changes the elevation Ev and azimuth Az of the protective optic 56. Finally, a third actuator 68 carried by the secondary dome (54) engages an edge or rim 59 for the bezel 58 so that actuation of the third actuator 68 rotates the bezel 58 along a roll axis R, which changes the orientation of the protective optics 56 and 57.

FIG. 6C illustrates a schematic of actuators for the articulating dome shell 50C according to FIGS. 4A-4B. A main actuator 62 engages an edge or rim 53' for the primary dome (52) so that actuation of the main actuator 62 rotates the primary dome (52) along the azimuth axis Az, which changes the azimuth of the protective optic 56. A secondary actuator 64 carried by the primary dome (52) engages an edge or rim 55' for the wide dome slit having the leaf set (54') so that actuation of the secondary actuator 64 extends or retracts covering across the wide dome slit by the leaf set (54') about an elevation axis Ev, which changes the elevation of the protective optic 56.

Figure 7A:
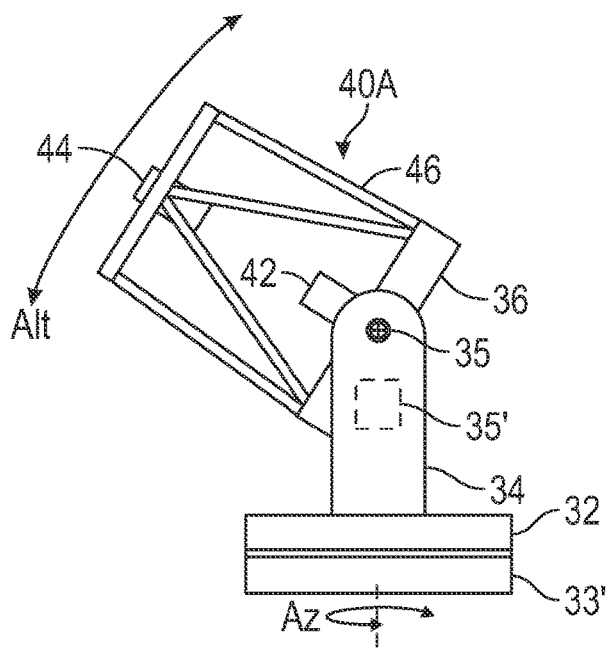
FIGS. 7A-7C illustrate examples of an articulating gimbal and beam expander of a laser source for use with the disclosed articulating dome shell.

Various structures can be used for the articulating gimbal and beam expander for the internal components of the beam director assembly of the present disclosure. For example, FIG. 7A illustrates one type of articulating gimbal 40A for use with the disclosed articulating dome shell (50). This articulating gimbal 40A uses an elevation-over-azimuth (Alt-Az) type of gimbal structure. A base actuator 33' rotates a mounting bracket swivel 32 about an azimuthal or pan axis Az. Forked arms 34 on the mounting bracket swivel 32 support a payload body 36. Using a carried actuator 35' on the swivel 32, the payload body 36 can be rotated about an orthogonal axis 35 to change the elevation or tilt axis Ev of the payload body 36. Because the articulating gimbal 40A is enclosed and protected in a dome shell (50) according to the present disclosure, the articulating gimbal 40A does not require extensive housing protections, seals, and other structures. Instead, the articulating gimbal 40A and the optical train for the beam can be configured with a frame and can have an open skeletal structure, which reduces weight and inertia. As a consequence, the articulating gimbal 40A can be moved more accurately and efficiently with such a structure.

As schematically shown, the optical train on the articulating gimbal 40A can include a laser source 42 on the payload body 36 and can include optics 44, such as curved mirrors, lenses, and the like, supported on a beam expander structure 46 constructed as a frame adjacent the laser source 42. These and other forms of structures can be used for the optical train and the articulating gimbal 40A. Notably, a heavy protective optic (not shown) does not need to be cantilevered at the distal end of the beam expander structure 46 because such a protective optic is supported on the enclosing dome shell, as discussed previously. If the laser source 42 is not on the payload body 36, the laser source 42 may be off-gimbal below the base actuator 33', and its beam may be conventionally transported via coudé optics enclosed within the forked arms 34.

Figure 7B:
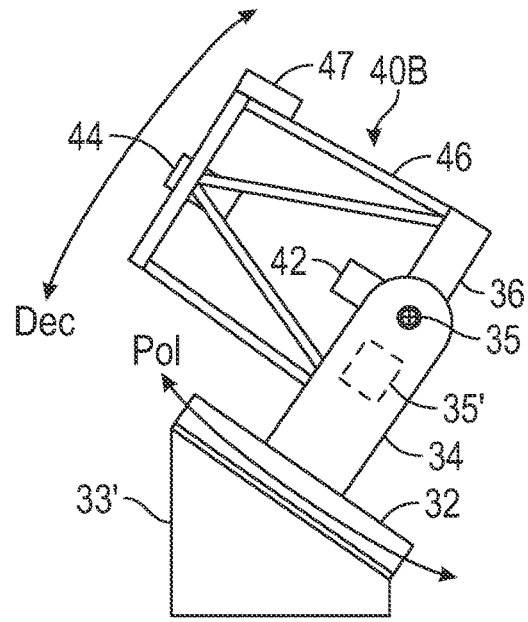

FIG. 7B illustrates another type of articulating gimbal 40B for use with the disclosed articulating dome shell (50). This articulating gimbal 40B uses an equatorial type of gimbal structure. Many of the components shown here are similar to those discussed above. Here, the mounting bracket swivel 32 is rotatable about a polar axis Pol, and the payload body 36 is rotated about a declination axis 35 (Dec).

Figure 7C:
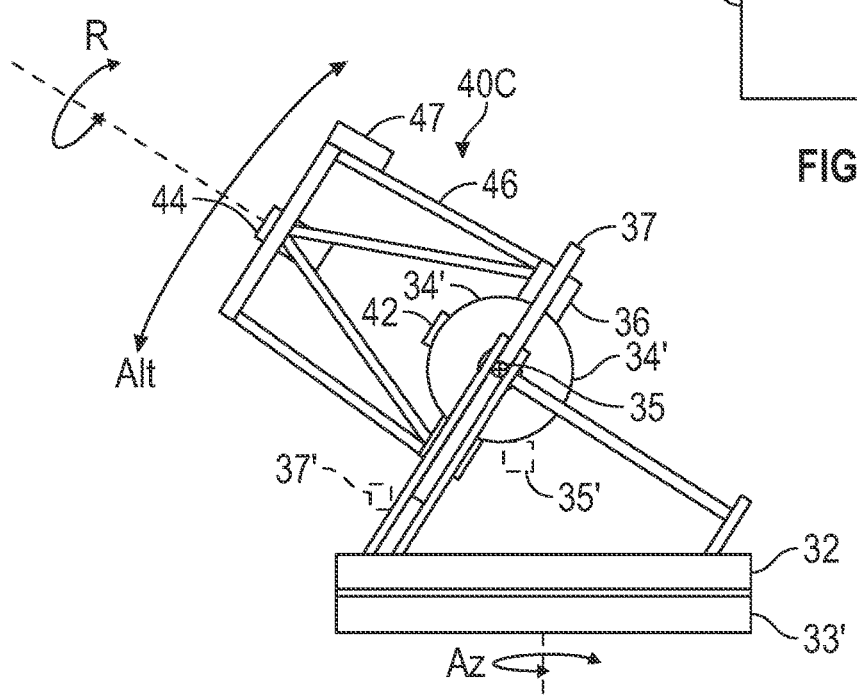

FIG. 7C illustrates yet another articulating gimbal 40C for use with the disclosed articulating dome shell (50). This articulating gimbal 40C uses a gimbal structure similar to an elevation-over-azimuth (Alt-Az) type of structure, but includes an additional roll axis R. A base actuator 33' rotates a base 32 about an azimuthal axis Az. A mounting swivel 34' on the base 32 supports a payload body 36, which can be rotated about an orthogonal axis 35 by a carried actuator 35' to change the elevation Ev of the payload body 36. Meanwhile, the payload body 36 and the orthogonal axis 35 are rotatable by another carried actuator 37' and a gear 37 about a roll axis R.

As shown, the beam expander structure 46 can include a secondary optical component 47, such as a sensor noted previously. Rotation of the payload body 36 on the gear 37 about the roll axis R can rotate the orientation of the secondary optical component 47. This configuration can be useful for the dome structure 50D of FIG. 5A-5B so the orientation of the secondary optical component 47 can be aligned and matched to the secondary optics (57) of the secondary dome (54).

Figure 8A:
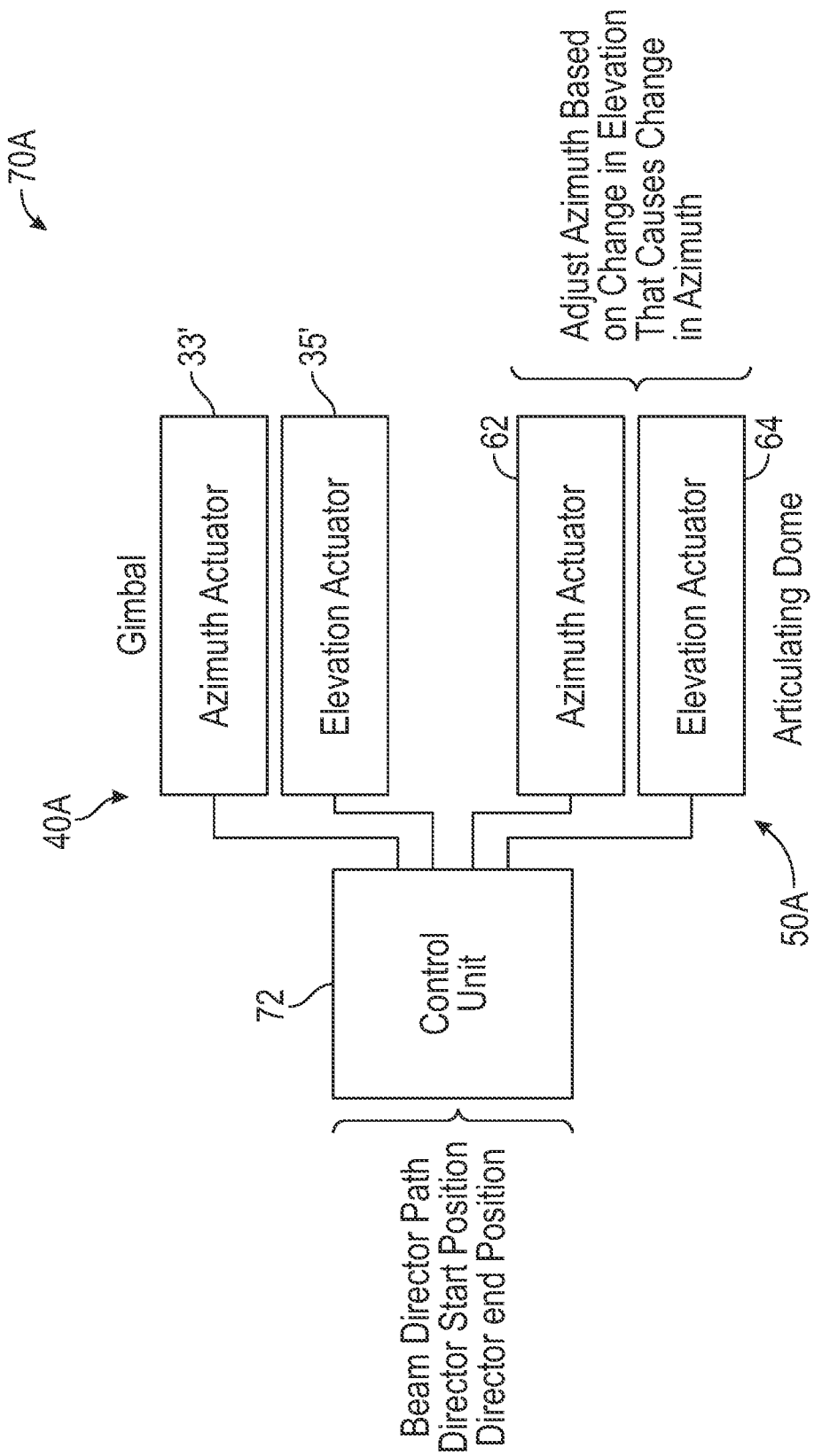
FIG. 8A illustrates a control system for the articulating dome shell according to FIGS. 2A-2B and 4A-4B.

FIG. 8A illustrates a control system 70A for the articulating dome shell 50A according to FIGS. 2A-2B. A control unit 72 connects to the actuators for the gimbal 40, including an azimuth actuator 33' and an elevation actuator 35'. The control unit 72 also connects to the actuators for the articulating dome shell 50A, including an azimuth actuator 62 and an elevation actuator 64. During operation, the control unit 72 receives inputs of the gimbal's movement to be matched or aligned by the dome shell 50A. If the dome shell 50A is to match the movement of the gimbal 40 along a prescribed trajectory, the control unit 72 can receive commands specifying the gimbal's path and can then itself command the matching movements for the dome shell 50A accordingly. If only the starting and ending positions of the gimbal 40 are specified, then the control unit 72 can control the dome shell 50A so its ending position matches the gimbal's end position. Either way, the control unit 72 calculates movements of the articulating dome shell 50A and implements the movement by controlling the actuators 62, 64. If the control unit 72 is integrated with the gimbal 40, then the control unit 72 calculates the movements of the gimbal 40 and implements the movement by controlling the actuators 33', 35'. As noted, adjustments to the secondary dome (54) on the primary dome (52) produce changes in both elevation and azimuth of the protective optic (56). The control unit 72 can make necessary adjustments to the movement of the dome shell 50A about the azimuth and elevation so the protective optic (56) can match the orientation of the articulating gimbal 40. These additional adjustments would not be necessary when this control system 70A is used with the dome shell 50C of FIGS. 4A-4B.

Figure 8B:
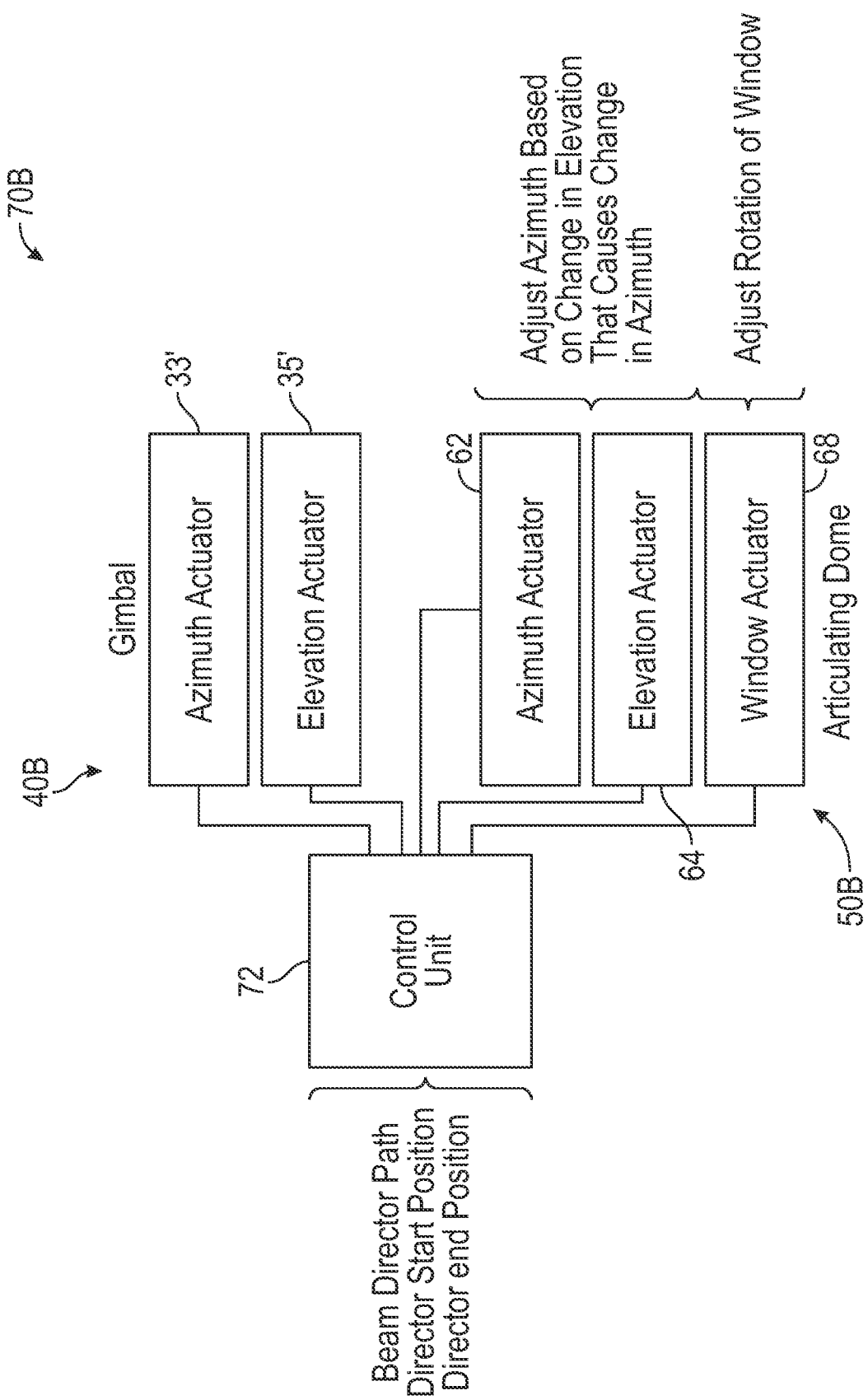
FIG. 8B illustrates a control system for the articulating dome shell according to FIGS. 3A-3B.

FIG. 8B illustrates a control system 70B for the articulating dome shell 50B according to FIGS. 3A-3B. As before, a control unit 72 connects to the actuators for the articulating gimbal 40, including an azimuth actuator 33' and an elevation actuator 35'. The control unit 72 also connects to the actuators for the articulating dome 50B, including an azimuth actuator 62, an elevation actuator 64, and a window actuator 68. During operation, the control unit 72 receives inputs of the gimbal's movement to be matched or aligned by the dome shell 50B. If the dome shell 50B is to match the movement of the gimbal 40 along a prescribed trajectory, then the control unit 72 can receive commands specifying the gimbal's path and can then itself command the matching movements of the dome shell 50B accordingly. If only the starting and ending positions of the gimbal 40 are specified, then the control unit 72 can control the dome shell 50B so its ending position matches the gimbal's end position. Either way, the control unit 72 calculates movements of the articulating dome shell 50B and implements the movement by controlling the actuators 62, 64, 68. If the control unit 72 is integrated with the gimbal 40, then the control unit 72 calculates the movements of the gimbal 40 and implements the movement by controlling the actuators 33', 35'.

As noted, adjustments to the secondary dome (54) on the primary dome (52) produce changes in both elevation and azimuth of the protective optic (56). The control unit 72 can make necessary adjustments to the movement of the dome shell 50B about the azimuth and elevation so the protective optic (56) can match the orientation of the articulating gimbal 40. As also noted, secondary optics 57 on the bezel (58) of the dome shell 50B need to be aligned with the secondary optical elements (47) on the beam expander on the gimbal 40. The control unit 72 can rotate the bezel (58) so that the optics (57) can match and remain aligned with the optical elements (47) on the gimbal 40.

Figure 8C:
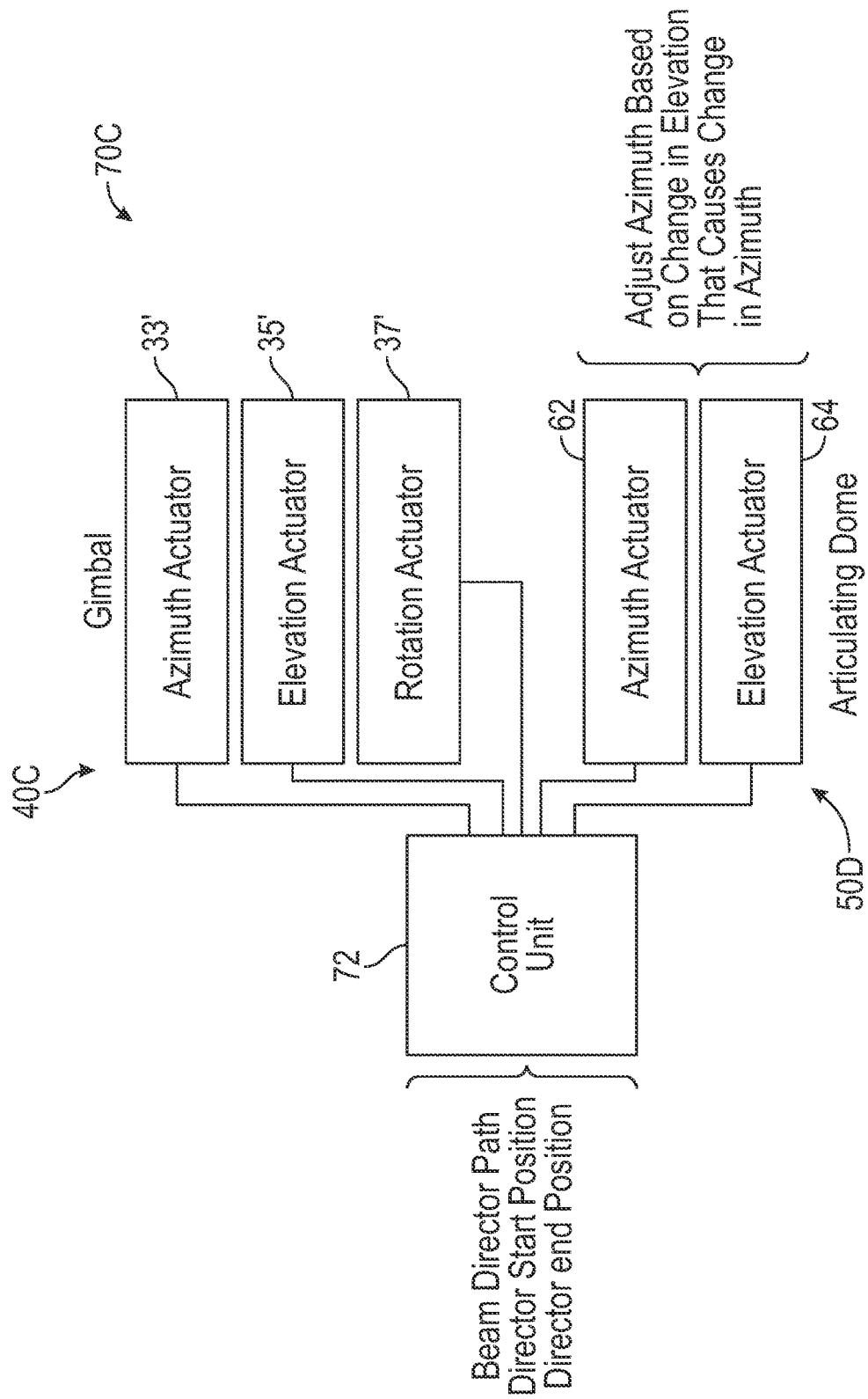
FIG. 8C illustrates a control system for the articulating dome shell according to FIGS. 5A-5B having a beam director according to FIG. 7C.

FIG. 8C illustrates a control system 70C for the articulating dome shell 50D according to FIGS. 5A-5B having a beam director according to FIG. 7C. As before, a control unit 72 connects to the actuators for the gimbal 40, which here include an azimuth actuator 33', an elevation actuator 35', and a rotational actuator 37'. The control unit 72 also connects to the actuators for the articulating dome shell 50D, including an azimuth actuator 62 and an elevation actuator 64. During operation, the control unit 72 receives inputs of the gimbal's movement to be matched or aligned by the dome shell 50D. If the dome shell 50D is to match the movement of the gimbal 40 along a prescribed trajectory, then the control unit 72 can receive the gimbal's path and then itself command the dome shell 50D matching movements accordingly. If the dome shell 50D is intended to align with the articulating gimbal 40 at endpoint positions, then the control unit 72 can control the dome shell 50D so its ending position matches the gimbal's end position. Either way, the control unit 72 calculates movements of the articulating dome shell 50D and implements the movement by controlling the actuators 62, 64. If the control unit 72 is integrated with the gimbal 40, then the control unit 72 calculates the movements of the gimbal 40 and implements the movement by controlling the actuators 33', 35', 37'.

As noted, adjustments to the secondary dome (54) on the primary dome (52) may produce changes in both elevation and azimuth of the protective optic (56). The control unit 72 can make necessary adjustments to the movement of the dome shell 50D about the azimuth and elevation so the protective optic (56) can match the orientation of the articulating gimbal 40. As also noted, secondary optics 57 on the dome shell 50D need to be aligned with the secondary optical elements (47) on the beam expander structure (46) of the gimbal 40. Here, the dome shell 50D may lack the rotatable bezel (58) having the optics 56, 57. Instead, the control unit 72 can rotate the beam expander structure (46) about the roll axis R so the optical elements (47) can match and remain aligned with the secondary optics (57).

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

The invention claimed is:

1. A structure for protecting an articulating gimbal mounted on a host, the articulating gimbal being configured to orient a first line-of-sight of a laser beam, the structure comprising:

a dome mounted on the host and enclosing the articulating gimbal, the dome having first and second shells, the first shell being rotatable about a first axis relative to the host, the second shell disposed on the first shell and being rotatable about a second axis relative to the first shell, the second shell having a first window;

a first actuator coupled to the first shell and being configured to rotate the first shell about the first axis relative to the host;

a second actuator coupled to the second shell and being configured to rotate the second shell about the second axis relative to the first shell; and a controller coupled to the first and second actuators and being configured to actuate the first and second actuators to position the first window in the first line-of-sight of the laser beam, the articulating gimbal having an ancillary optical element having a second line-of-sight adjacent the laser beam, wherein the second shell defines an opening therein;

wherein the first window comprises:

a bezel mounted in the opening and having an outer edge and an inner edge, the bezel having an ancillary window;

a protective optic mounted in the inner edge of the bezel; and a third actuator coupled to the bezel and being configured to articulate the bezel about a third axis relative to the second shell; and wherein the controller is further coupled to the third actuator and is configured to actuate the third actuator to position the second window in the second line-of-sight of the ancillary optical element.

2. The structure of claim 1, wherein the second shell defines an opening therein; and wherein the window comprises a protective optic mounted in the opening.

3. The structure of claim 1, wherein the controller is coupled to at least one gimble actuator of the articulating gimbal and is configured to receive feedback of articulation of the articulating gimbal from the at least one gimble actuator, the controller being configured to coordinate the actuation of the first and second actuators to the feedback of the articulation of the articulating gimbal.

4. The structure of claim 1, wherein the controller is coupled to at least one gimble actuator of the articulating gimbal and is configured to control articulation of the articulating gimbal by the at least one gimble actuator.

5. An apparatus for use on a host, the apparatus comprising:

an articulating gimbal configured to mount on the host, the articulating gimbal having at least two gimbal actuators and being configured to orient a line-of-sight of a laser beam; and a structure according to claim 1 for protecting the articulating gimbal.

6. A structure for protecting an articulating gimbal mounted on a host, the articulating gimbal being configured to orient a first line-of-sight of a laser beam, the structure comprising:

a first dome shell mounted on the host and enclosing a first portion of the articulating gimbal, the first shell having a first edge disposed thereabout and defining a first opening therein;

a first seal disposed between the first edge of the first shell and the host;

a first actuator coupled to the first dome shell and being configured to rotate the first shell on the first edge about a first axis relative to the host;

a second dome shell mounted in the first opening of the first dome shell and enclosing a remaining portion of the articulating gimbal, the second dome shell having a second edge disposed thereabout and having a first window therein;

a second seal disposed between the second edge of the second dome shell and the first opening of the first dome shell;

a second actuator coupled to the second dome shell and being configured to rotate the second dome shell on the second edge about a second axis relative to the first dome shell; and a controller coupled to the first and second actuators and being configured to actuate the first and second actuators to position the first window in the first line-of-sight of the laser beam, the articulating gimbal having an ancillary optical element having a second line-of-sight adjacent the laser beam, wherein the second dome shell defines a second opening therein;

wherein the first window comprises:

a bezel mounted in the second opening and having an outer edge and an inner edge, the bezel having an ancillary window;

a protective optic mounted in the inner edge of the bezel;

a third seal disposed between the outer edge of the bezel and the second opening of the second dome shell; and a third actuator coupled to the bezel and being configured to articulate the bezel on the outer edge about a third axis relative to the second dome shell; and wherein the controller is further coupled to the third actuator and is configured to actuate the third actuator to position the second window in the second line-of-sight of the ancillary optical element.

7. The structure of claim 6, wherein the first and second dome shells are each composed of a material selected from the group consisting of a metal material, a plastic material, and a composite material.

8. The structure of claim 6, wherein the second dome shell defines a second opening therein; and wherein the first window comprises a protective optic mounted in the second opening.

9. The structure of claim 6, wherein the controller is coupled to at least one gimble actuator of the articulating gimbal and is configured to receive feedback of articulation of the articulating gimbal from the at least one gimble actuator, the controller being configured to coordinate the actuation of the first and second actuators to the feedback of the articulation of the articulating gimbal.

10. The structure of claim 6, wherein the controller is coupled to at least one gimble actuator of the articulating gimbal and is configured to control articulation of the articulating gimbal by the at least one gimble actuator.

11. The structure of claim 6, wherein the first edge circumscribes the first axis about which the first dome shell is rotatable, wherein the first opening is circular, wherein the second edge circumscribes the second axis about which the second dome shell is rotatable.

12. The structure of claim 6, wherein the first opening is offset from the first axis about which the first dome shell is rotatable; and wherein the first window of the second dome shell is offset from the second axis about which the second dome shell is rotatable.

13. An apparatus for use on a host, the apparatus comprising:
- an articulating gimbal configured to mount on the host, the articulating gimbal having at least two gimbal actuators and being configured to orient a line-of-sight of a laser beam; and
- a structure according to claim 7 for protecting the articulating gimbal, wherein the articulating gimbal comprises an ancillary optical element having a second line-of-sight adjacent the laser beam;
- wherein the second dome shell defines a second opening;
- wherein the first window comprises:
  - a bezel mounted in the second opening and having an outer edge and an inner edge, the bezel having an ancillary window;
  - a protective optic mounted in the inner edge of the bezel;
  - a third seal disposed between the outer edge of the bezel and the second opening of the second dome shell; and
  - a third actuator coupled to the bezel and being configured to rotate the bezel about a third axis relative to the second dome shell; and
- wherein the controller is further coupled to the third actuator and is configured to actuate the third actuator to position the second window in the second line-of-sight of the ancillary optical element.

14. The apparatus of claim 13, wherein the articulating gimbal comprises an azimuth-over-elevation gimbal or an equatorial gimbal.

15. The apparatus of claim 13,
- wherein the articulating gimbal is configured to orient the second line-of-sight of the ancillary optical element about a roll axis relative to the laser beam;
- wherein the protective optic is aligned for the line-of-sight of the laser beam; and
- wherein the ancillary window has another protective optic mounted therein for the ancillary optical element.

* * * * *